United States Patent
Carper et al.

(10) Patent No.: US 7,090,894 B2
(45) Date of Patent: Aug. 15, 2006

(54) BONDCOAT FOR THE APPLICATION OF TBC'S AND WEAR COATINGS TO OXIDE CERAMIC MATRIX

(75) Inventors: Douglas Melton Carper, Trenton, OH (US); Andrew Jay Skoog, West Chester, OH (US); Jane Ann Murphy, Franklin, OH (US)

(73) Assignee: General Electric Company, Schenectady, NY (US)

( * ) Notice: Subject to any disclaimer, the term of this patent is extended or adjusted under 35 U.S.C. 154(b) by 172 days.

(21) Appl. No.: 10/775,453

(22) Filed: Feb. 10, 2004

(65) Prior Publication Data

US 2006/0128548 A1   Jun. 15, 2006

(51) Int. Cl.
  B05D 1/02 (2006.01)
  B05D 1/38 (2006.01)
  B05D 3/02 (2006.01)
  C03C 8/02 (2006.01)
  C04B 35/10 (2006.01)

(52) U.S. Cl. ............... 427/383.5; 427/375; 427/397.7; 501/14; 501/153; 501/154

(58) Field of Classification Search ............... 428/630, 428/631, 632, 633, 640; 501/14, 152, 153, 501/154, 53; 427/372.2, 375, 383.1, 383.3, 427/383.5, 383.7, 397.7, 397.8
See application file for complete search history.

(56) References Cited

U.S. PATENT DOCUMENTS

| | | |
|---|---|---|
| 3,361,583 A * | 1/1968 | Elarde et al. ............... 264/624 |
| 3,930,085 A | 12/1975 | Pasiuk |
| 4,330,575 A | 5/1982 | Litchfield et al. |
| 4,973,564 A | 11/1990 | Chyung et al. |
| 5,080,977 A | 1/1992 | Zaplatynsky |
| 5,169,674 A | 12/1992 | Miller |
| 5,305,726 A | 4/1994 | Scharman et al. |
| 5,488,017 A | 1/1996 | Szweda et al. |
| 5,534,328 A | 7/1996 | Ashmead et al. |
| 5,626,923 A | 5/1997 | Fitzgibbons et al. |
| 5,820,976 A | 10/1998 | Kamo |
| 5,942,333 A | 8/1999 | Arnett et al. |
| 5,985,369 A | 11/1999 | Sangeeet al. |
| 6,045,928 A | 4/2000 | Tsantrizos et al. |
| 6,071,628 A | 6/2000 | Seals et al. |
| 6,168,874 B1 | 1/2001 | Gupta et al. |
| 6,210,791 B1 * | 4/2001 | Skoog et al. ............... 428/325 |
| 6,261,643 B1 | 7/2001 | Hasz et al. |
| 6,296,909 B1 | 10/2001 | Spitsberg et al. |
| 6,319,108 B1 | 11/2001 | Adefris et al. |
| 6,322,897 B1 | 11/2001 | Borchert et al. |
| 6,340,500 B1 | 1/2002 | Spitsberg |
| 6,413,578 B1 * | 7/2002 | Stowell et al. ............... 427/142 |
| 6,465,090 B1 * | 10/2002 | Stowell et al. ............... 428/325 |

* cited by examiner

Primary Examiner—Michael E. Lavilla
(74) Attorney, Agent, or Firm—McNees Wallace & Nurick LLC

(57) ABSTRACT

A bond coat composition is provided for applying to the surface of a ceramic composite component between the composite substrate and the thermal barrier coat. The composition includes an alumina powder, a silica-yielding liquid, glass frits, and sufficient solvent to permit mixing of the components and forming a bond coat.

11 Claims, 3 Drawing Sheets

BONDCOAT FOR THE APPLICATION OF TBC'S AND WEAR COATINGS TO OXIDE CERAMIC MATRIX

BACKGROUND OF THE INVENTION

The present invention relates generally to a bond coat composition for use with ceramic matrix composites. Specifically, the present invention relates to a bond coat composition for use with thermal barrier/wear coatings for ceramic matrix composites.

In some applications, a structural part is exposed to high surface temperatures on a heated surface of the part. These structural part constructions, such as ceramic matrix composites (CMCs), provide structural support for components associated with engine exhaust, and possibly the engine itself. An oppositely disposed surface of the part is cooled with a flow of cooling air. The maximum temperature reached by the part is determined by a balance between the amount of heat that enters the part from the heated surface, and the amount of heat removed by the cooling air flow over the cooled surface. Examples of such applications include combustors, nozzles, liners, exhaust flaps, seals and turbines in aircraft gas turbine engines.

It is known to apply a thermal barrier coating (TBC) to the heated surface of the part to serve as an insulation that reduces the heat flow into the part and allows it to operate in a hotter external environment. The TBC typically includes a metallic bond coat overlying the metallic substrate that forms the part, and a ceramic layer overlying the bond coat. The bond coat improves the adherence of the ceramic layer to the substrate. The ceramic layer, such as a zirconium-based ceramic, reduces the heat flow into the substrate from the hot surface.

Coated articles having a ceramic substrate, an intermediate thermal barrier coating overlying the substrate, and a low-emissivity metallic top coat over the thermal barrier coating are known. The available thermal barrier coatings typically utilize a ceramic layer overlying an intermediate metallic bond coat. The ceramic layer insulates the substrate, and the metallic bond coat improves the adherence of the ceramic layer to the substrate. The low-emissivity top coat reflects some of the radiant thermal radiant energy incident upon the coated article, so that the ceramic part below is exposed to less heat input. While operable, the available systems with metallic top coats have not been practical for use in high-temperature environments such as gas turbines, because the reflective metal degrades and/or volatilizes after brief exposure, frequently in minutes, to the high-temperature, corrosive environment.

It has been found that the bond coat is critical to the service life of the thermal barrier coating system in which it is employed, and is therefore also critical to the service life of the component protected by the coating system. The oxide scale formed by a diffusion aluminide bond coat is adherent and continuous, and therefore not only protects the bond coat and its underlying substrate by serving as an oxidation barrier, but also chemically bonds the ceramic layer. Nonetheless, aluminide bond coats inherently continue to oxidize over time at elevated temperatures, which gradually depletes aluminum from the bond coat and increases the thickness of the oxide scale. Eventually, the scale reaches a critical thickness that leads to spallation of the ceramic layer at the interface between the bond coat and the aluminum oxide scale. Once spallation has occurred, the component will deteriorate rapidly, and therefore must be refurbished or scrapped at considerable cost. Therefore, what is needed is a bond coat composition for use with CMCs that is inexpensive to make, easy to form and apply in a consistent manner, and tightly adheres both to the CMC substrate and TBC for providing enhanced durability improvement to the CMC.

SUMMARY OF THE INVENTION

One embodiment of the present invention is directed to a bond coat composition for use with a ceramic composite component. The composition, as applied, includes an alumina powder, silica-yielding liquids, glass frits, and sufficient solvent to permit mixing of the components and forming a bond coat.

A further embodiment of the present invention is directed to a method of producing a coated ceramic composite component having a substrate. The steps include providing a ceramic composite component having a substrate, applying a bond coat over the substrate, wherein the bond coat is formed by mixing an alumina powder, a silica-yielding liquid, glass frits and evaporable solvent, applying a ceramic coat over the bond coat, and firing the ceramic composite component.

One advantage of the bond coat composition of the present invention is that it is inexpensive to make.

Another advantage of the bond coat composition of the present invention is that it is easy to mix and apply in a consistent manner, and that a TBC/wear coat may be applied either before or after the bond coat has been applied.

A further advantage of the bond coat composition is that it may be applied in the form a slurry spray, a tape, or may be brushed on the CMC substrate surface.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

The present invention is generally applicable to CMC components that operate within environments characterized by relatively high temperatures, and are therefore subjected to a hostile oxidizing environment and severe thermal stresses and thermal cycling. Notable examples of such components include the high and low pressure turbine nozzles and blades, shrouds, exhaust flaps, seals, combustor liners and augmentor hardware of gas turbine engines. While the advantages of this invention will be described with reference to gas turbine engine hardware, the teachings of the invention are generally applicable to any CMC component on which a thermal barrier coating system may be used to protect the component from its environment.

Figure 1:
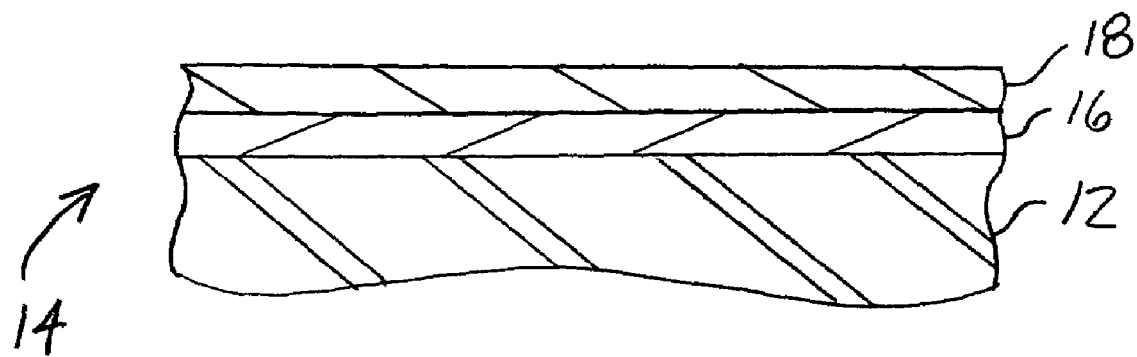
FIG. 1 is a cross section of a ceramic matrix composite including the bond coat of the present invention.

Represented in FIG. 1 is a thermal barrier coating system 14 in accordance with this invention. The coating system 14 is shown as including a ceramic layer 18 and a glass bond coat 16 overlying a substrate 12, which bond coat 16 predominantly comprises the matrix material, typically aluminum silicate. The alumina silicate matrix material is reinforced by oxide fibers to form the CMC. The glass bond coat 16 may then be fired, preferably from about 1,650° F. for about 6 hours to about 1,900° F. for about 2 hours, to form a glassy bond coat prior to the application of the ceramic coat 18, which forms a TBC/wear coat. Alternately, ceramic coat 18 may be applied over bond coat 16 prior to the firing process.

Bond coat 16 is generally characterized by an additive layer that overlies substrate 12, the ceramic coat 18 then being applied over the bond coat 16 for protecting the substrate 12 from thermal and abrasive elements which are associated with its operating environment. Bond coat 16 may be applied to the surface of substrate 12 as a slurry spray, a tape or by brush. The bond coat 16 is comprised of a mix of alumina powder, such as aluminum oxide, a silica-yielding liquid, such as silicone resins, and glass frits. Glass frits may be defined as a ceramic material that is amorphous and ground to a fine powder. In one embodiment, the glass frits are a mix of calcium oxide, silicon oxide, aluminum oxide, barium oxide, and magnesium oxide. The percentage composition of these oxides varies, depending upon the desired melting temperature desired, with the range of melting temperatures being from about 1,200° F. to about 1,400° F. Alternately, glass frits mixtures, such as those produced by Vitrifunctions of Youngwood, Pa. under the names V55B2 and V212 and by Ferro Corporation of Cleveland, Ohio under the name EG2782, may also be used.

To prepare bond coat 16, the alumina powder and the glass frits are added together in substantially equal quantities by weight and preferably account for about 90 percent by weight of the bond coat solids. The silica-yielding liquid accounts for the remaining portion of the bond coat solids as the liquid is transformed to a solid. A sufficient amount of dispersant, such as Merpol® A, which is a registered trademark assigned to Stepan Company of Norfield, Ill., is provided to prevent the powdered components from clumping together during mixing. The evaporable solvent, typically ethanol or isopropyl alcohol, comprises the balance of the mixture and is added to achieve the desired consistency.

During heat treatment, bond coat 16 chemically bonds with the ceramic layer 18 to the bond coat 16. A suitable thickness for the bond coat 16 is from about 2 to about 4 mils (0.002–0.004 inches).

Once bond coat 16 is applied over substrate 12 and fired as previously discussed, bond coat 16 and substrate 12 form both chemical and mechanical bonds. First, due to the porosity and surface roughness in substrate 12, bond coat 16, especially when applied as a slurry, is absorbed into the substrate porosity and mechanically bonded to the surface roughness. These mechanisms form the basis for a mechanical bond. Additionally, during firing, the bond coat layer 16 forms a dispersion of alumina silicate which chemically bonds with silica in the substrate 12 to form a very tight chemical bond between bond coat 16 and substrate 12.

The ceramic layer 18 overlying the glass bond coat 16 is required for high temperature components of gas turbine engines. A preferred ceramic layer 18 is achieved by air plasma spray (APS) techniques known in the art, e.g., electron beam physical vapor deposition (EBPVD), though ceramic layers also may be formed by physical vapor deposition (PVD) techniques. A suitable material for the ceramic layer 18 is alumina, though other ceramic materials could be used, including yttria or zirconia stabilized by magnesia, yttria, ceria, scandia or other oxides. Similar to the bond between substrate 12 and bond coat 16, the glass bond coat 16 and the alumina of ceramic layer 18 chemically react to form a chemical bond. Further, when application techniques, such as APS, are used, the applied droplets that form ceramic layer 18 form a mechanical bond with bond coat 16. The ceramic layer 18 is deposited to a thickness that is sufficient to provide the required wear protection for the underlying substrate 12, generally from about 2 mils to about 25 mils (0.002–0.025 inches). Preferably, the ceramic layer 18 is from about 3 mils to about 10 mils (0.003–0.010 inches) thick.

During the heat treatment, or treatments if the bond coat 16 is heat treated prior to applying the ceramic layer 18, which must then be heat treated, the oxide powders in the ceramic layer 18 and the alumina powder in the bond coat 16 are melted together. Additionally, an amount of alumina in the substrate 12 mixes with the molten bond coat 16 mixture. This mixture of the oxide powders in the ceramic layer 18 with the alumina in the substrate 12, after firing, acts to raise the melting point of the resulting bond coat 16. Stated another way, upon firing the mixed oxide powders in the ceramic layer 18 and alumina powder in the bond coat 16, further including alumina from the substrate 12, the melting point of the resulting bond coat 16 is increased from about 1,500° F. to about 1,950° F., and possibly more, depending upon the composition of the oxide powders in the ceramic layer 18. By virtue of the raised melting point temperature of the bond coat, the coated ceramic component may be exposed to higher temperatures, which, for jet engine applications, typically provides increased efficiency.

Further, the bond coat forms a continuous glossy layer that acts not only to seal the substrate from diffusion of harmful elements, but also as a wear coat.

Testing has revealed that a ceramic layer applied to a CMC substrate without a bond coat begins to spall immediately when subjected to ground engine testing simulating engine operating conditions. However, a ceramic layer applied to a CMC substrate with the bond coat of the present invention did not spall after being subjected to the equivalent of about 2,000 engine flight hours of ground engine testing.

Figure 2:
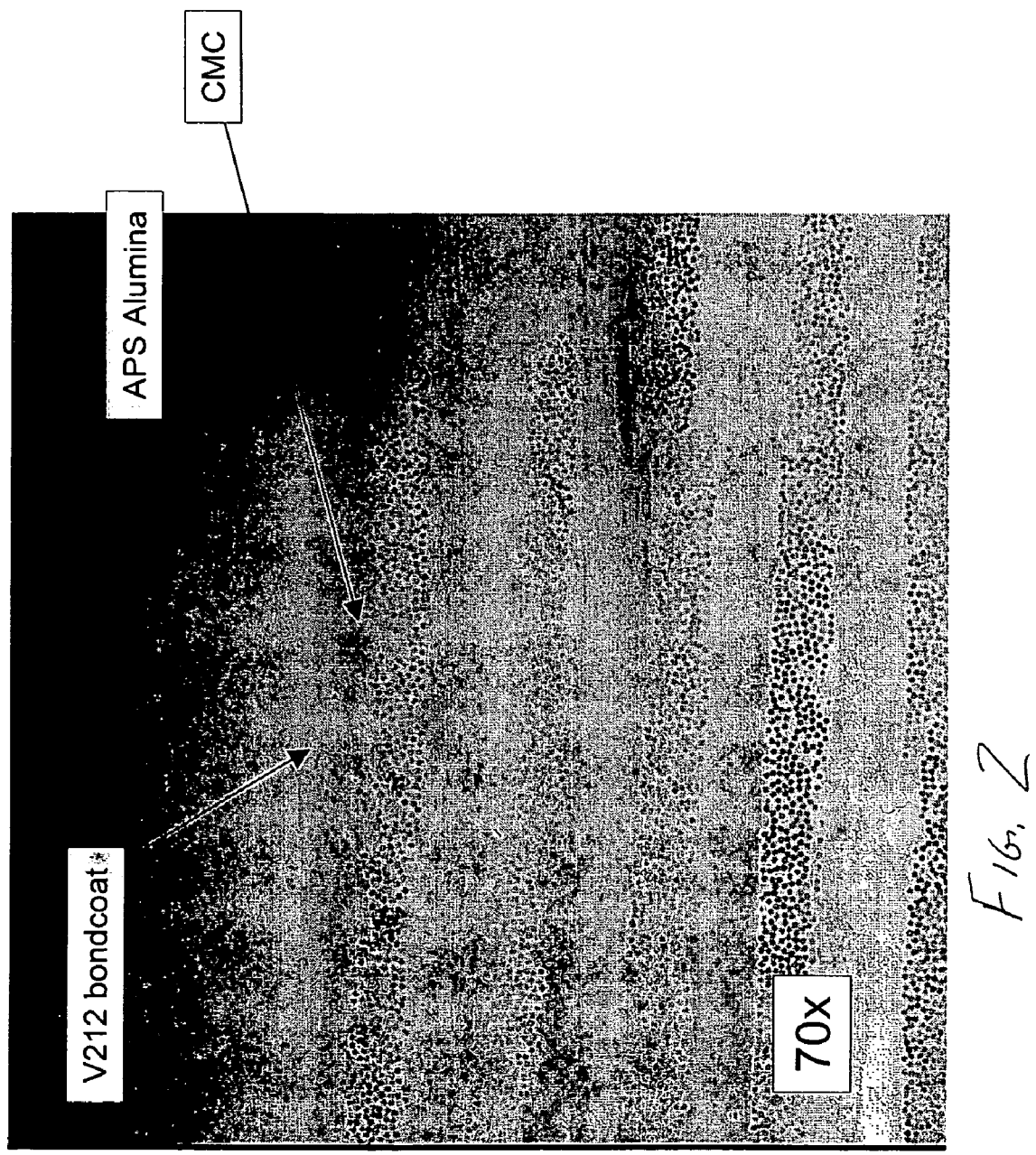
FIGS. 2 and 3 are magnified cross sections of 70× and 500×, respectively, of a ceramic matrix composite including the bond coat of the present invention.
Figure 3:
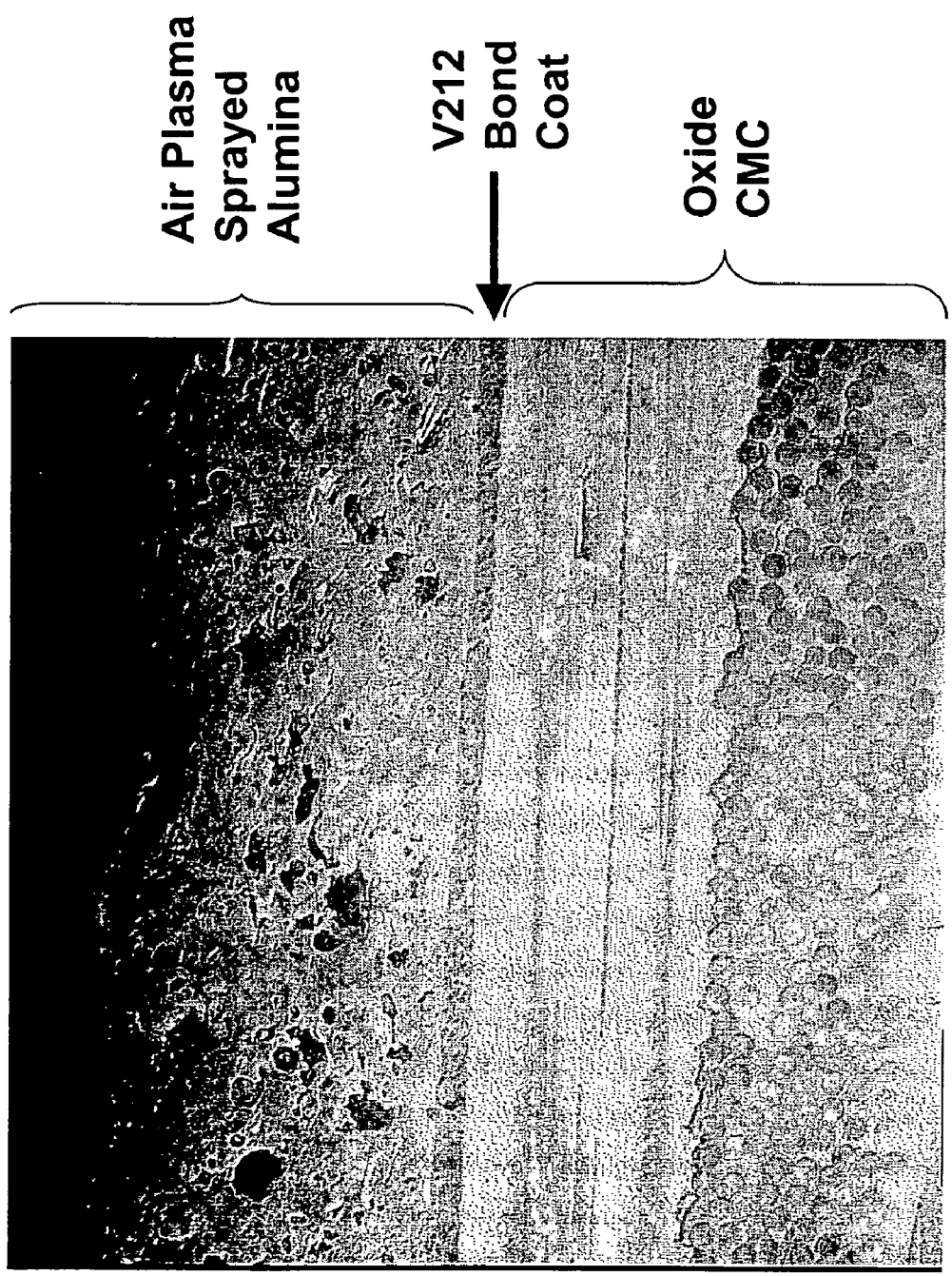

FIGS. 2 and 3 are magnified cross sections of a ceramic matrix composite including a bond coat composition of the present invention for use with thermal barrier/wear coatings. The Figures, which are magnified by 70× and 500×, show the void-filled ceramic layer 18 comprised of alumina that was applied by air plasma spray technique. The ceramic layer 18 overlies and tightly adheres to a layer of bond coat 16, which is composed of V212, the bond coat 16 being applied over the CMC substrate 12.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A composition for forming a bond coat for use with a ceramic composite component, the composition comprising:
 an alumina power;
 a silica-yielding liquid;
 glass frits, wherein the alumina powder and the glass frits each comprises about 45 weight percent, and the silica-yielding liquid comprise a remaining solids portion of the composition; and
 an amount of solvent sufficient to permit mixing of the components and forming a bond coat.

2. The composition of claim 1 wherein the silica-yielding liquid is comprised of silicone resins.

3. The composition of claim 1 wherein the solvent is comprised of ethanol and isopropyl alcohol.

4. The composition of claim 1 further comprising a dispersant.

5. The composition of claim 1 wherein the glass frits are a mixture comprising calcium oxide, silicon oxide, aluminum oxide, barium oxide, and magnesium oxide.

6. The composition of claim 5 wherein a percentage weight of each component of the total weight of the mixture is controlled to provide a predetermined melting point of the bond coat.

7. The composition of claim 1 wherein the composition is applied to a surface of a component as a slurry spray.

8. The composition of claim 1 wherein the composition is applied to a surface of a component as a tape.

9. The composition of claim 1 wherein the composition is applied to a surface of a component with a brush.

10. A method of producing a coated ceramic composite component having a substrate, the steps comprising:
 providing a ceramic composite component having a substrate;
 applying a bond coat over the substrate, wherein the bond coat is formed by
  mixing an alumina powder, a silica-yielding liquid, glass frits and solvent;
 firing the ceramic composite component;
 applying a ceramic coat over the bond coat; and
 firing the ceramic composite component.

11. A method of producing a coated ceramic composite component having a substrate, the steps comprising:
 providing a ceramic composite component having a substrate;
 applying a bond coat over the substrate, wherein the step of applying the bond coat is selected from the group consisting of slurry spraying and brushing, wherein the bond coat is formed by
  mixing an alumina powder, a silica-yielding liquid, glass frits and solvent;
 applying a ceramic coat over the bond coat; and
 firing the ceramic composite component, wherein the step of firing the ceramic composite includes the step of mixing alumina in the substrate with the molten bond coat.

* * * * *